United States Patent [19]

Bergkvist

[11] 4,159,577
[45] Jul. 3, 1979

[54] DEVICE FOR INDICATING A HORIZONTAL DIRECTION AND ONE OR MORE ANGLE SECTORS ABOUT SAID DIRECTION

[76] Inventor: Lars A. Bergkvist, Gottne, 890 42 Mellansel, Sweden

[21] Appl. No.: 860,046

[22] Filed: Dec. 13, 1977

[30] Foreign Application Priority Data

Dec. 14, 1976 [SE] Sweden ............................... 7614074

[51] Int. Cl.² ............................................... G01C 9/06
[52] U.S. Cl. ....................................... 33/366; 73/517 R
[58] Field of Search ...................... 33/366; 250/231 R; 73/517 R, 517 B

[56] References Cited

U.S. PATENT DOCUMENTS

| | | | |
|---|---|---|---|
| 3,389,266 | 6/1968 | Okuno | 250/231 R |
| 3,657,551 | 4/1972 | Lingert et al. | 33/366 X |
| 3,758,949 | 9/1973 | Fausel et al. | 250/231 R |
| 3,776,315 | 12/1973 | Gill et al. | 33/366 X |
| 3,798,454 | 3/1974 | Weiss | 250/231 R |

Primary Examiner—Charles E. Phillips
Attorney, Agent, or Firm—Silverman, Cass & Singer

[57] ABSTRACT

A device for indicating both a horizontal direction and an angle sector about said direction, formed of a disc rotatably supported in a housing with its center of gravity offset relative to the axis of rotation of the disc, the disc being transparent except for a substantially sector-shaped non-transparent area. Two or more reading members are provided for reading the position of said sector relative to the housing. The reading members are positioned so that said members are covered by said sector-shaped area when the housing shows a horizontal direction, and the sector-shaped area is displaced from a condition covering two or more members to a condition exposing one or more members when the disc is rotated through an angle greater than a certain angle relative to the housing.

6 Claims, 7 Drawing Figures

U.S. Patent  Jul. 3, 1979  4,159,577
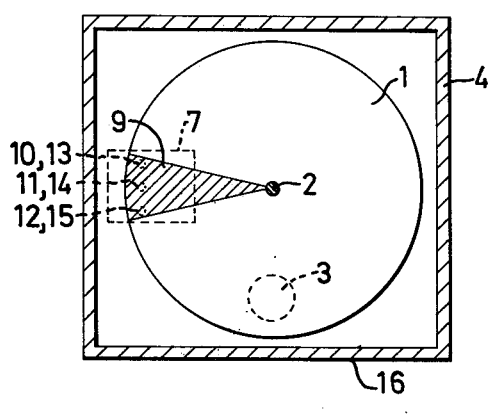
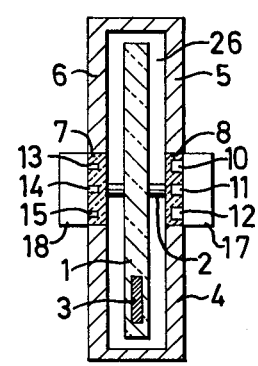
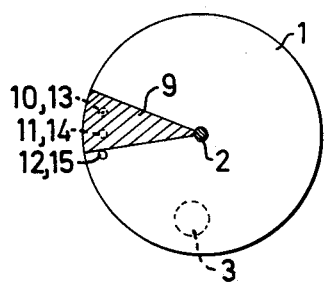
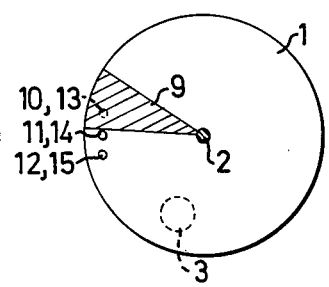
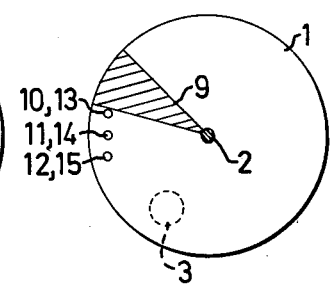
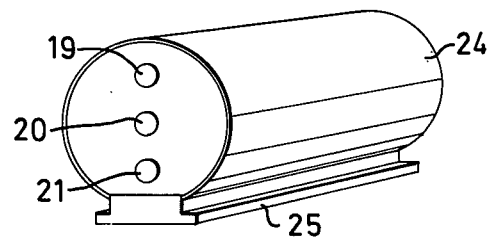
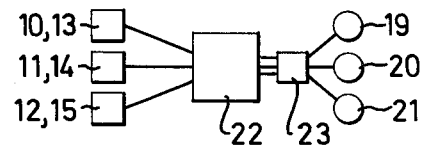

DEVICE FOR INDICATING A HORIZONTAL DIRECTION AND ONE OR MORE ANGLE SECTORS ABOUT SAID DIRECTION

This invention relates to a device for indicating a horizontal direction and an angle sector about said direction.

A great number of devices for indicating a horizontal direction are already existing, for example bubble-levels, lead-comprising devices, etc.

Conventional devices of this kind generally are of such a nature that they distinctly indicate only a horizontal direction via a suitable indicator. Angle sectors about the horizontal direction are indicated only as a displacement of said indicator from the position indicating the horizontal direction.

Conventional devices, furthermore, are very difficult to read when the object to be subjected to measurement is moving heavily, for example vigorously vibrated. As an example of such conditions can be mentioned, that arms supporting rock drills are to be directed at a certain angle to the horizontal plane. Such arms vibrate with a frequency of about 50 Hz and an amplitude of about 5–10 mm. It is very difficult under such conditions to indicate a horizontal direction for the arm or a portion thereof by conventional means.

Obviously it is very difficult to read under such conditions a permissible angle sector by known means, especially if the sector is indicated very accurately.

The present invention solves the aforesaid problem thereby, that the device according to the invention is designed so as to signal by means of indication lamps if the device is positioned in a horizontal direction or a permissible angle sector or sectors about said direction.

The present invention, thus, relates to a device for indicating a horizontal direction and an angle sector about said direction, comprising a disc supported rotatably in a surrounding housing and with its centre of gravity offset outside the position of the axle of rotation of the disc.

The invention is characterized in that the disc is transparent, except for a substantially sector-shaped non-transparent area, that two or more reading members for reading the position of said sector relative to said housing are positioned so relative to said sector-shaped area that said members are covered by said area when the housing shows a horizontal direction, and that the sector-shaped area is displaced from covering two or more members to exposing one or more members when the disc is rotated through an angle greater than a certain angle relative to the housing.

The invention is described in the following, with reference to the accompanying drawing, in which FIG. 1 shows a disc associated with an indication device according to the invention and a housing enclosing the disc, FIG. 2 shows said disc inserted in the enclosing housing provided with reading members, FIGS. 3–5 show different positions of said disc relative to said reading members, FIG. 6 shows a container with indication lamps enclosing a device according to the invention, FIG. 7 is a block diagram for a detector means.

FIG. 1 shows a disc 1 and a housing 4 surrounding the disc. The centre of gravity of the disc 1 is offset outside the position of its axle of rotation 2 by means of a weight 3 located close to the periphery of the disc.

The disc preferably is made of a transparent plastic material. In FIG. 2 the disc 1, by way of a lateral section, is shown positioned in the surrounding housing 4. The disc 1 is suspended rotatably via an axle 2 and supported in two vertical side walls 5, 6 of the housing 4. The housing 4 is sealed and filled with a damping oil 26, for example silicone oil. Each of the two vertical side walls 5, 6 of the housing include a transparent opening 7, 8, which are located directly in front of one another and sealingly closed by a suitable transparent plastic. The housing 4 in general can be transparent, too. In FIG. 1, an opening 7 is shown by dashed lines. The disc 1 is provided with a non-transparent sector-shaped area 9, preferably a sector of a circle, with a sector angle smaller than 90°.

The disc 1, as mentioned, is supported rotatably in said housing 4. Due to the offset position of the gravity centre of the disc 1 outside its axle of rotation, said disc always will place itself in a position at which the vertical line extends through the gravity centre and the axle of rotation of the disc. The position of the sector-shaped area 9 relative to the housing 4, thus, always will depend, for example, of the angle of one of the side walls of the housing 4 in relation to the horizontal plane. In the openings 7, 8 reading members are located to read the position of the circle sector 9 relative to said housing.

The reading members comprise each a lighting source, for example a light-emitting diode 10, 11,12, and a light-sensitive element, for example a phototransistor 13, 14, 15. The light-emitting diodes 10–12 are located stationary at one opening 8 in the housing, and the phototransistors 13–15 are located in a second opening 7. Each light-emitting diode 10–12 is directed to a phototransistor 13–15. The light-emitting diodes are of a known type and arranged to emit substantially parallel light. The reading members 10–15 are located close to the periphery of the disc 1, preferably along a line in parallel with a tangent to the disc 1 or along an arc located concentrically relative to the periphery of the circle.

The lower surface 16 of the housing preferably is used as reference surface, to which the object abuts, of which the angle with a horizontal direction is to be indicated.

The surface 16 being in a horizontal position, the disc 1 is positioned relative to the housing 4 and the surface 16 as shown in FIG. 1, and the sector-shaped area 9 covers the members 10–16. When the surface 16 forms a certain angle to a horizontal direction, the disc 1 still will be in the vertical position, and the sector-shaped area is offset from covering all members 10–16 to covering a smaller number of members. In FIG. 3 a situation is shown when the disc 1 has been rotated in relation to the housing 4 so that only two members 10, 13, 11, 14 are covered by the area 9. This situation occurs when the disc has been rotated through a certain angle relative to the housing. After the disc has been rotated additionally through a certain angle, the area 9 covers only one member 10, 13, as shown in FIG. 4. When the disc has been rotated still additionally through a certain angle, the area does not cover any one of the members 10–15, as shown in FIG. 5. It is understood that a corresponding situation occurs when the disc 1 is rotated counterclockwise instead of clockwise as shown in the FIGS. 3–5.

The light-emitting diodes 10–12 and the phototransistors 13–15, respectively, are attached to the housing 1 in holders 17 and 18, respectively. From the holders 18 of the phototransistors electric conductors extend to an electronic detector circuit 22 of a suitable known type which evaluates the phototransistors which are conductive, because they are met by light from an associated light-emitting diode. On the basis of the conductivity of the phototransistors the detector circuit 22 actuates a number of lamps 19-21, which indicate the angle sector within which the disc 1 is rotated relative to the housing 4, as described above with reference to FIGS. 3-5. The detector circuit preferably is connected to a means 23 for effecting the blinking of an actuated lamp. The device is designed so that by varying the position of the reading members the size of said angle sectors can be varied. As an example can be mentioned, that at the directing of arms supporting rock drills said arms should be directed with an angle deviating at maximum ±0.7° from the ideal angle. Over that, deviations with an angle of 0.7°-6° can be tolerated in both directions from the ideal angle. For such use, thus, the reading members 10-15 are positioned so that the area 9 only covers two, 10,13, 11,14 of the three members 10-15 (see FIG. 3) for an angle between ±0.7° and ±6°, and that the area 9 covers only one, 10,13, of the three members 10-15 (see FIG. 4) or none thereof (see FIG. 5) for an angle exceeding ±6°.

In FIGS. 1,3-5 the size of the area 9 and of the reading members 10-15 are not in agreement with the above examples.

In FIG. 6 a contaiber 24 for a device according to the invention is shown, which in its lower portion is provided with an attachment bar 25. At the forward end thereof three lamps 19-21 are mounted. The lower surface 16 of the housing 4 preferably is positioned in parallel with the longitudinal axis of the attachment bar 25. The container preferably is filled, besides the components, with polyurethane plastic. The detector means 23 is disposed so that, when the angle of the attachment bar 25, and therewith of the lower surface 16 of the housing 4, to the horizontal plane is 0°±0.7°, i.e. when all members 10-15 are covered by the area 9, only the central, green, lamp 20 blinks. When the angle of the attachment bar 25 to the horizontal plane is +0.7° to +6° and −0.7° to −6°, respectively, i.e. when the area covers two of three members, the lower lamp 21 and the upper lamp 19, respectively, which both are red, blink together with the central, green, lamp 20. This angle sector is such, that a correction of the angle of the attachment bar to a position closer to the horizontal plane is desirable. When the angle of the attachment bar to the horizontal plane exceeds +7° and −7°, respectively, i.e. when only one of the members is covered by the area, only the lower lamp 21 and the upper lamp 19, respectively, blink. As is apparent from above, the upper lamp 19 will blink when the forward end of the container 24 points downward and, therefore, the upper lamp 19 and lower lamp 21, respectively, indicate the direction of correction.

It is obvious that the attachment bar of the container can be set horizontally to the object to be put in position even when the object is not in a horizontal direction.

The present invention has the advantage, that certain angle sectors of interest for a certain use can be distinctly indicated. Owing to the indication lamps 19-21 it is very simple and easy to decide the angle sector, and possible also the direction of correction, in which the object is positioned on which the device is located. A circle sector-shaped area 9 of a smaller width and a denser positioning of the reading members 10-15 render it possible to obtain angle sectors of a smaller width. Due to the damping of the disc 1 by oil 26 in the housing 4, narrow angle sectors can be indicated with high precision and reliability even at heavy vibrations.

The invention must not be regarded restricted to the above embodiments. The sector-shaped area 9, for example, can be designed in a different way, e.g. as a tape. The reading members 10-15 can be varied, both with respect to their number and their location relative to the housing 1.

I claim:

1. A device for indicating both a horizontal direction and at least one angle sector about said direction, said device comprising a housing, a disc rotatably mounted with said housing surrounded by same and means on the disc offsetting the center of gravity of said disc relative to the axial center of rotation thereof, said disc including a substantially sector-shaped area having a light-transmissivity different from the remainder of said disc, reading means including plural light sources and light-sensitive elements arranged in source-receiver pairs with the disc passing between each source and respective receiver and said source-receiver pairs responsive to change in light-transmissivity for indicating the position of said disc relative to the orientation of said housing, said sector-shaped area being movable with the rotation of said disc between at least two conditions, the first of said conditions occurring where all the source-receiver pairs are covered by said sector-shaped area when the orientation of the housing indicates a first horizontal direction, the second of said conditions occurring when said housing is differently oriented whereby to rotate said disc angularly a given degree, said sector-shaped area of said disc being moved with said rotation uncovering at least one of said source-receiver pairs whereby to indicate an angle sector along said horizontal direction but within said area yet other than assumed at said first condition, said disc being capable of being rotated with change of orientation of said housing whereby to expose all of said source-receiver pairs when the degree of rotation is greater than said angle sector represented by said area.

2. The indicating device as claimed in claim 1 in which said sector area is non-light transmitting.

3. The indicating device as claimed in claim 1 in which said reading means are located close to the periphery of said disc along an arc concentric with the periphery of said disc.

4. The indicating device as claimed in claim 1 in which said reading means are carried on said housing.

5. The indicating device as claimed in claim 1 in which said source-receiver pairs each comprise light emitting means located on one side of the disc and light sensitive means on the opposite side of the disc.

6. A device for indicating a horizontal direction and one of a plurality of angle sectors about said direction, comprising a transparent disc, a surrounding housing, means for rotatably supporting said disc having its centre of gravity offset from the rotational axis of said disc and having indicating members comprising plural paired light sources and light sensitive elements for indicating the rotational position of said disc, said disc having a substantially sector-shaped non-transparent area and being located between a light source and its respective light sensitive element, at least two of said indicating members are positioned for reading the position of said sector area relative to said housing, said indicating members being arranged relative to the sector-shaped area whereby said members are covered by the sector-shaped area when the housing shows an initiate horizontal direction, said disc is rotated with change in orientation of said housing so said sector-shaped area is moved from a condition covering at least two of said indicating members to exposing at least one of said members when the disc is rotated to a position outside said direction relative to the housing, which position lies within an angle sector within which at least one of said members are covered and the remainder exposed and said sector-shaped area also being movable with rotation of said disc to expose all of said indicating members when rotation is outside the angle sector represented by said area.

* * * * *